US012501903B2

(12) United States Patent
Baumgartner et al.

(10) Patent No.: US 12,501,903 B2
(45) Date of Patent: Dec. 23, 2025

(54) ROTARY CUTTER WITH WRAP PREVENTION

(71) Applicant: General Mills, Inc., Minneapolis, MN (US)

(72) Inventors: Aaron Baumgartner, Savage, MN (US); Roberta Marie Langenfeld, Minnetonka, MN (US); Dalton Sherrill, Loretto, MN (US); Michael Snyder, Stacy, MN (US); Andrew Friend Souder, Joplin, MO (US); Kiara Cristina Camareno Vargas, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 164 days.

(21) Appl. No.: 18/521,341

(22) Filed: Nov. 28, 2023

(65) Prior Publication Data

US 2025/0169511 A1    May 29, 2025

(51) Int. Cl.
*A21C 11/10* (2006.01)
*G06T 7/00* (2017.01)

(52) U.S. Cl.
CPC ............ *A21C 11/10* (2013.01); *G06T 7/0004* (2013.01); *G06T 2207/30128* (2013.01)

(58) Field of Classification Search
CPC ................. A21C 11/10; G06T 2207/30128
See application file for complete search history.

(56) References Cited

U.S. PATENT DOCUMENTS

| 3,589,817 | A | * | 6/1971 | Sugaya | G01N 21/8901 |
| | | | | | 250/559.49 |
| 4,111,624 | A | | 9/1978 | Hanson | |
| 4,276,480 | A | | 6/1981 | Watson | |
| 5,466,143 | A | | 11/1995 | Suzuki et al. | |
| 5,824,349 | A | | 10/1998 | Muller | |
| 8,284,248 | B2 | * | 10/2012 | Bourg, Jr. | G06V 10/56 |
| | | | | | 382/110 |

(Continued)

FOREIGN PATENT DOCUMENTS

| DE | 102005056888 | 5/2007 |
| EP | 3132900 | 2/2017 |
| WO | WO 2010/143460 | 12/2010 |

OTHER PUBLICATIONS

Smith, "*What are Photo Eye Sensors, and How Do They Improve System Automation?*", Bastian Solutions, Retrieved from the Internet, https://www.bastiansolutions.com/blog/what-are-photo-eye-sensors-and-how-do-they-improve-system-automation/, May 21, 2019.

*Primary Examiner* — Sean M Michalski
(74) *Attorney, Agent, or Firm* — Jordan IP Law, LLC; Tina Yin Sowatzke, Esq.

(57) ABSTRACT

A system and method for detecting and compensating for deformities or other irregularities in sheeted dough being delivered to a rotary cutter in order to preemptively avoid cutter wrap-up is provided. The detection system includes one or more sensors capable of identifying and monitoring irregularities in the dough upstream of the rotary cutter. Signals from the sensor(s) are sent to a controller which, upon detecting a dough irregularity which could cause cutter wrap-up, automatically raises the rotary cutter until the irregularity passes the cutter.

18 Claims, 3 Drawing Sheets

(56) References Cited

U.S. PATENT DOCUMENTS

| | | | |
|---|---|---|---|
| 8,757,058 B2* | 6/2014 | Kien | B26F 1/22 |
| | | | 101/23 |
| 8,960,836 B2* | 2/2015 | Martin | A23G 4/062 |
| | | | 347/3 |
| 9,220,279 B2 | 12/2015 | Suski et al. | |
| 2018/0153178 A1* | 6/2018 | Tokuhara | B26D 1/06 |
| 2019/0108396 A1* | 4/2019 | Dal Mutto | G06V 20/52 |
| 2023/0123896 A1* | 4/2023 | Ekstedt | B26D 7/1863 |
| | | | 156/510 |
| 2023/0217934 A1* | 7/2023 | Gustafson | A21C 11/12 |
| | | | 426/549 |

* cited by examiner

ROTARY CUTTER WITH WRAP PREVENTION

FIELD OF THE INVENTION

The invention generally pertains to the art of food and, more particularly, to the controlled cutting of sheeted dough products and to their apparatus for and methods of production.

BACKGROUND OF THE INVENTION

Due to the time demands placed on consumers by the everyday activities of modern life, the preparation of food products from scratch has decreased and the popularity of premade or partially premade foods has increased dramatically. Such products include pre-made dough products that is ready-to-bake (or that is frozen and just needs to be thawed before baking). Examples of such pre-made dough products include pie crusts, pizza crusts and crescent rolls. Typically, sheets of dough are formed (e.g., between rollers) and undergo further processing (e.g., cutting) before they are packaged and refrigerated or frozen. In the case of pre-made pie crust dough products, oval or circular pieces are typically cut from a sheet of pie dough in sizes designed to fit in conventional pie pans and cut pieces are rolled up and packaged for sale. Similarly, in the case of pre-made pizza crust dough products, circular or rectangular pieces are cut in sizes to fit conventional baking sheets and the pieces are rolled up and packaged.

In the commercial manufacturing of such products, an elongated sheet of dough is directed along a conveyor to a cutting apparatus, such as a rotary cutter, which creates the individual product pieces that are then directed for further processing and packaging. Obviously, the various operational stages are timed to provide for a continuous manufacturing operation. However, if the elongated sheet of dough delivered to the cutting apparatus includes an irregularity or deformity, such as a hole, thinned area or even a crease, the dough can get wrapped up on the rotary cutter, requiring the entire manufacturing line to be shut down until the dough can be unwrapped from the cutter, i.e., the manufacturing line is stopped and the deformed dough on the rotary cutter is manually removed before the line can be restarted. In practice, it has been found that it takes, on average, about 2.5-3 minutes from line stoppage to start-up which, in one established production line, has resulted in a loss of about 90-110 cases of finished product per hour.

SUMMARY OF THE INVENTION

The present invention is directed to a system and method for detecting and compensating for deformities or irregularities in sheeted dough being delivered to a rotary cutter in order to preemptively avoid cutter wrap-up. The detection system includes one or more visual sensors capable of capturing irregularities in the dough upstream of the rotary cutter. Signals from the visual sensor(s) are sent to a controller which, upon detecting a dough irregularity which could cause cutter wrap-up, automatically raises the rotary cutter until the irregularity passes the cutter. In a particularly preferred form of the invention, the rotary cutter is supported by an adjustable repositioning device, such as a vertical lift/lower device. With this arrangement, when the visual sensor detects an upcoming irregularity leading to the rotary cutter, the controller causes the repositioning device to be shifted to a non-cutting position spaced from the sheeted dough until the irregularity passes the rotary cutter, at which time the rotary cutter is automatically lowered to a cutting position for continued, normal production operation. Although useable product is not produced when the rotary cutter is in the non-cutting position, downstream the cut product pieces are separated from the remainder of the dough sheet and the remaining dough is recycled so the bypassed dough sheet portion containing the irregularity is simply added to the recycled dough portion and used in the later formation of product.

The overall system preferably further includes a cutter rotation unit, preferably a servo controlled rotary cutter positioning unit regulated by the controller. In addition to the visual sensor which senses irregularities, a separate sensor is provided to detect any actual dough wrapping up on the rotary cutter. With this overall arrangement, when a wrap-up condition is detected, the controller is used to stop operation of the production line, automatically lift the rotary cutter up to a high, inactive position and rotate the cutter roller to a specific rotary position with a gap in the cutting pattern to make removal of the wrap and subsequent line restart efficient.

Additional objects, features and advantages of the invention will become readily apparent from the following description of preferred embodiments of the invention when taken in conjunction with the drawings wherein like reference numerals refer to corresponding structure in the various views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
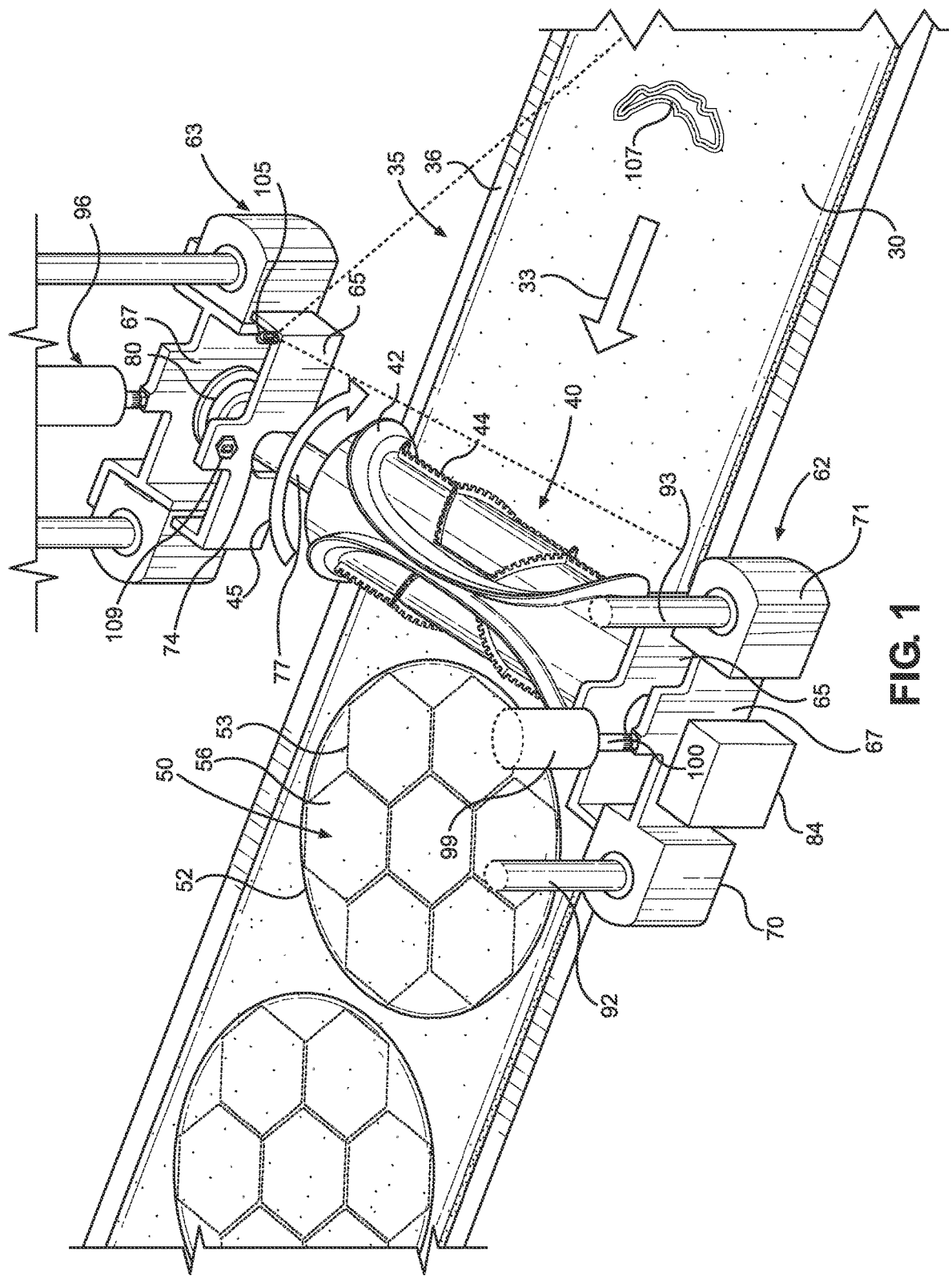
FIG. 1 is a perspective view of a portion of a production line for producing dough sheet pieces employing a rotary cutter with wrap prevention in accordance with the invention, with the rotary cutter in a lowered, operational or cutting position.

FIG. 1 illustrates a portion of an exemplary production line for producing dough pieces 1 in accordance with the present invention. Specifically, this figure shows a dough sheet 30 being transported in direction 33 on a conveyor system 35. In the embodiment illustrated, conveyor system 35 includes a conveyor belt 36 on which dough sheet 30 is supported. However, other conveyor systems known in the art can be used with the present invention.

Dough sheet 30 is preferably made from a dough suitable for making a pie crust or a pizza crust. However, other doughs, such as doughs for other refrigerated or frozen dough products, can be used to make dough sheet 30. Also, dough sheet 30 can be made from one or more types of known flours, including gluten-free flours, as desired. Further, it should be recognized that the width of dough sheet 30 can vary.

During normal operation, dough sheet 30 passes beneath a rotary cutter 40. In the exemplary embodiment shown, rotary cutter 40 includes a peripheral cutter member 42 and various perforation members, one of which is labeled 44. Certainly, various cutter configurations could be employed with the present invention as will become fully evident below. In any case, rotary cutter 40 is driven during normal use to rotate in direction 45 and repeatedly cut dough pieces 50. Based on the described structure of rotary cutter 40, each dough piece has a periphery 52 which can take essentially any desired geometric shape, along with various product perforations 53, establishing potential dough sub-pieces 56. As the particular product or product shape can greatly vary for use with the invention, at this point it is only important to understand that, during normal production operation, dough sheet 30 is being directed to rotary cutter 40 which engages the sheet of dough 30 to cut dough product pieces which are later processed and packaged. Certainly, cutting a dough sheet in this manner is known to form various dough pieces, including pizza crusts, circular pie crusts, tortillas and the like, with the invention adapting this concept, by extension, for use in connection with addressing the problem of dough wrap-up as detailed further below. In any case, dough sheet 30 with various dough pieces 50 cut therein is further processed and dough pieces 50 are packaged. For example, dough pieces 50 are separated from dough sheet 30, sometimes rolled and placed in packages (e.g., shrink wrap, bags, spiral-wound cylinders or the like). Certainly, alternative or additional processing and packaging can be employed after dough pieces 50 are cut from dough sheet 30, depending on the manufacturer's needs and designs. The trimming portions of dough sheet 30 which are not cut into dough pieces 50 are actually later removed and recycled.

Figure 2:
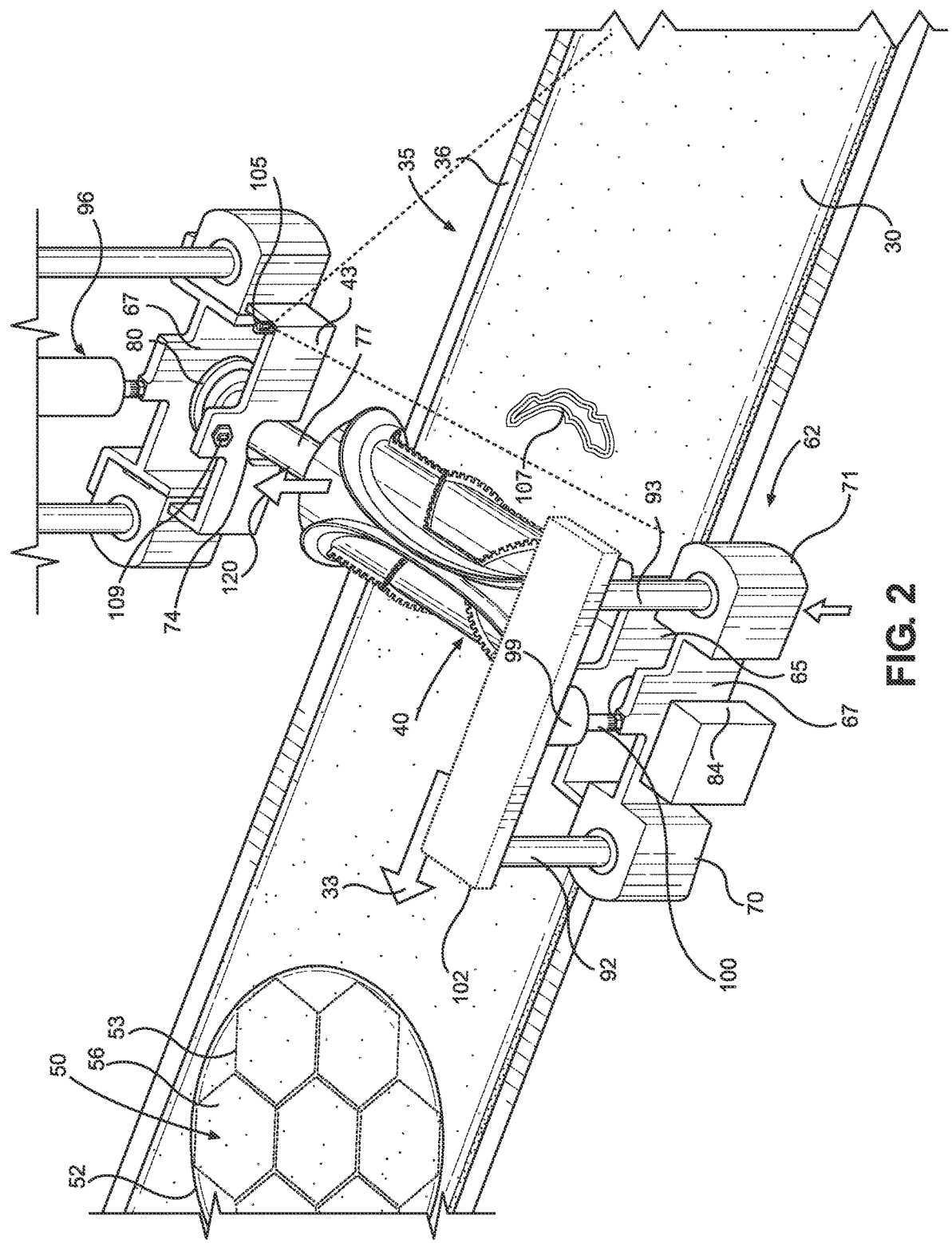
FIG. 2 is a perspective view of the production line portion of FIG. 1 with the rotary cutter in a slightly raised, non-cutting position.

One feature associated with the present invention is the manner in which rotary cutter 40 is supported above dough sheet 30, particularly in a manner which enables rotary cutter 40 to be selectively repositioned relative to dough sheet 30 between at least cutting and non-cutting positions. Before detailing an exemplary support arrangement, it should be noted that rotary cutter 40 could be repositioned utilizing various mechanical support and body shifting arrangements such that the preferred embodiment to be described is intended for understanding of the invention, rather than being limiting to the particular structure or direction of operation. In any case, as shown in FIGS. 1 and 2, rotary cutter 40 is supported by support bodies 62 and 63. Support bodies 62 and 63 are located on opposite sides of conveyor belt 36, with rotary cutter 40 extending between support bodies 62 and 63 while being arranged to rotate about an axis extending perpendicular to direction 33. Support bodies 62 and 63 are similarly constructed, with each support body 62, 63 shown to include an inner plate 65, an outer plate 67 and spaced support journals 70 and 71, all of which are joined to form an integral unit. Inner plate 65 is formed with an opening 74 through which extends a shaft 77 of rotary cutter 40. Shaft 77 is rotatably supported by a bearing 80 carried by outer plate 69. A combination motor and transmission unit (collectively labeled 84) is provided for causing rotary cutter 40 to be positively driven through shaft 77 to rotate in direction 45. Each full rotation of rotary cutter 40 results in one dough piece 50 being cut from dough sheet 30.

In the embodiment shown, the repositioning system includes a pair of upstanding posts 92 and 93 for each support body 62, 63. More specifically, upstanding posts 92 and 93 extend vertically through journals 70 and 71 respectively, and are fixed at both upper and lower ends (not shown for clarity of the drawings). In this fashion, support bodies 62 and 63, along with rotary cutter 40, can shift relative to dough sheet 30, with posts 92 and 93 guiding the movement of journals 70 and 71. However, it is only important in accordance with the invention that the movement be relative to the sheet of dough 30 such that rotary cutter 40 can be repositioned between a cutting position, wherein peripheral cutter member 42 and perforation members 44 can functionally cut and perforate dough sheet 30, and a non-cutting position, wherein rotary cutter 40 is spaced from the sheet of dough 30. In the embodiment shown, this movement is vertical, but other directional movement could be employed depending on the relative positioning of these components. In addition, various different known repositioning actuators could be employed to achieve this function. In the embodiment shown, spaced lift/lower devices are constituted by linear actuators 96, each including a fixed cylinder 99, which is secured to fixed upper support 102 (partially shown for drawing clarity) and the same structure employed in fixing upper ends of guide posts 92 and 93 on both sides of conveyor 36, and a piston 100 attached to outer plate 67.

In further accordance with the present invention, this relative movement is performed automatically under certain sensed conditions. In particular, as clearly shown in FIG. 1, an irregularity sensor 105, such as a camera or other visual sensor, is employed to visually monitor a portion of dough sheet 30 upstream of rotary cutter 40 for an irregularity 107 in dough sheet 30. Irregularity 107 can constitute a hole, an unintentionally created thin area, a crease or the like. Basically, such an irregularity, if reaching rotary cutter 40, could cause a condition referred to as "wrap-up" which is where the dough wraps around rotary cutter 40, resulting in a situation wherein the entire product line must be shut down until the wrapped dough can be removed from about rotary cutter 40 and the cutting operation reset. As indicated above, this production down time can be several minutes and is costly in lost production. Before detailing how signals from sensor 105 are used in looking to preemptively avoid this situation, it should also be noted that a separate sensor 109, such as a photo-eye, can also be optionally provided to signal the occurrence of any actual wrap-up condition.

Figure 3:
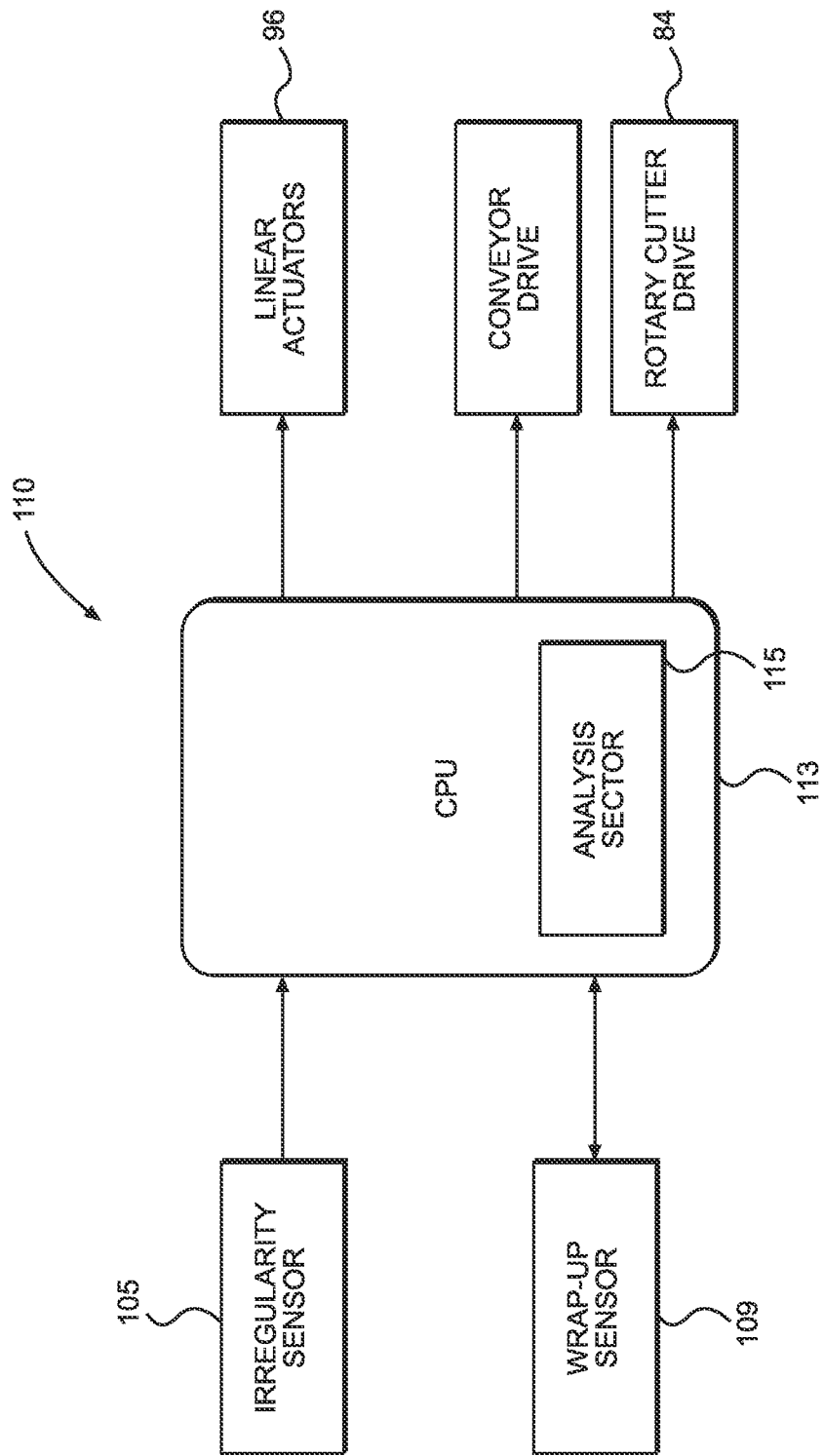
FIG. 3 is a block diagram of a system for controlling operation of the rotary cutter in the production line.

Reference will now be made to FIG. 3 which illustrates a controller 110 configured to automatically activate the repositioning system to cause rotary cutter 40 to shift from a cutting position in engagement with the sheet of dough 30 to a non-cutting position spaced from the sheet of dough 30 based on signals received from sensor 105 until the irregularity 107 passes rotary cutter 40 as conveyor moves in direction 33. As shown in FIG. 3, controller 110 includes a CPU 113 having an analysis sector 115. Signals from sensor 105 are relayed to controller 110 and processed by analysis sector 115 to determine the existence of irregularity 107. Overall, in the commercial mass production of such dough pieces, it should be realized that dough sheet 30 is processed in such a manner that the dough is generally of uniform thickness and consistency. In the case of sensor 115 being a camera, irregularity 107 will generally appear as a unique region (e.g., a darkened region) in dough sheet 30 which can be clearly, visually distinguished from the remainder of dough sheet 30. When this occurs, controller 110 functions to reposition rotary cutter 40 by automatically regulating the repositioning system, in this case activating linear actuators 96 to cause rotary cutter 40 to shift in the direction of arrow 120 (FIG. 2) from a cutting position in engagement with the sheet of dough 30 to a non-cutting position spaced from the sheet of dough 30. The movement of the irregularity 107 is monitored and a timing is established for irregularity 107 to pass rotary cutter 40 (see FIG. 2), at which time controller 110 again causes repositioning of rotary cutter 40 back to its cutting position. In this fashion, rotary cutter 40 is basically controlled to "jump" irregularity 107 such that the invention provides a way to proactively avoid downtime resulting from a potential wrap-up situation. The degree to which rotary cutter 40 is raised is minimized as much as possible to expedite the re-establishment of the cutting position. By way of example, rotary cutter 40 is shifted to be out of contact with dough sheet 30 by as little as 1/16" to the non-cutting position. In connection with the overall production process, the region of dough sheet 30 which includes irregularity 107 is not wasted, but rather will be later combined with trimming portions of dough sheet 30 which are not cut into dough pieces 50 so as to be later recycled.

The above discussion sets forth the automatic control of rotary cutter 40 between two positions, i.e., cutting and non-cutting positions. In further accordance with another aspect of the invention, rotary cutter 40 can also be automatically repositioned into an inactive position spaced further from the sheet of dough than the non-cutting position upon sensing of a dough wrap-up condition. In connection with this aspect of the invention, CPU 113 processes signals from sensor 109 which is focused on an upper region of rotary cutter 40 as rotary cutter 40 rotates during cutting of dough sheet 30 into dough pieces 50. If dough somehow becomes wrapped around rotary cutter 40, this situation will be readily sensed with sensor 109, e.g., by blockage of the photo-eye light. Under these conditions, controller 110 is configured to halt the drive of conveyor 36, deactivate motor and transmission unit 84 and actuate linear actuators 96 to raise rotary cutter 40 high above conveyor 36 (not shown). Basically, an automatic shutdown of the production line occurs until, with rotary cutter 40 advantageously in a high position above conveyor 36, any dough wrapped around rotary cutter 40 can be readily, manually removed without resorting to actually removing rotary cutter 40. Therefore, in preferred embodiments, the movement of conveyor 36 is maintained when rotary cutter 40 is in either one of the cutting and non-cutting positions, however conveyor 36 is stopped and a rotation of rotary cutter 40 halted when rotary cutter 40 is placed in the inactive position.

In accordance with a still further aspect of the invention, it is desired to control the rotation of rotary cutter 40 to place rotary cutter 40 in the best position for a production restart following either of the above-described forms of repositioning rotary cutter 40. To this end, a servo system is employed in connection with combination motor and transmission unit 84 and controller 110 is utilized to accurately regulate the drive for rotary cutter 40 through at least one servo of the system to reset an angular position of rotary cutter 40 while the rotary cutter 40 is spaced from the sheet of dough 30.

Based on the above, it should be readily apparent that the present invention provides an automated system for proactively avoiding dough wrap-up situations when employing a rotary dough cutter. In addition, the overall system also looks to provides for enhanced controls to reduce downtime in the event of a wrap-up situation. Furthermore, the invention seeks to angularly reposition the rotary cutter after the rotary cutter is taken out of a cutting position such that, when the cutter is returned to its cutting position, an optimal startup positioning exists. While certain preferred embodiments of the present invention have been set forth, it should be understood that various changes or modifications could be made without departing from the spirit of the present invention. In general, the invention is only intended to be limited by the scope of the following claims.

The invention claimed is:

1. A dough product production line comprising:
   a rotary cutter;
   a conveyor for directing a sheet of dough to the rotary cutter;
   a repositioning system for shifting the rotary cutter relative to the conveyor;
   a sensor for detecting an irregularity in the sheet of dough upstream of the rotary cutter; and
   a controller configured to activate the repositioning system to cause the rotary cutter to shift from a cutting position in engagement with the sheet of dough to a non-cutting position spaced from the sheet of dough based on signals received from the sensor until the irregularity passes the rotary cutter.

2. The dough product production line of claim 1, wherein the repositioning system includes a lift/lower device configured to vertically raise and lower the rotary cutter relative to the sheet of dough.

3. The dough product production line of claim 2, wherein the lift/lower device includes linear actuators which are selectively activated by the controller to raise or lower the rotary cutter between the cutting and non-cutting positions.

4. The dough product production line of claim 1, further comprising at least one servo, regulated by the controller, to reset an angular position of the rotary cutter while the rotary cutter is spaced from the sheet of dough.

5. The dough product production line of claim 1, wherein the sensor comprises a camera.

6. The dough product production line of claim 1, further comprising a separate sensor, linked to the controller, for sensing any dough wrapping about the rotary cutter, said controller being configured to stop the production line based on signals from the separate sensor.

7. The dough product production line of claim 6, wherein the separate sensor constitutes a photo-eye.

8. The dough product production line of claim 6, wherein the controller is further configured to activate the repositioning system to cause the rotary cutter to shift to an inactive position spaced further from the sheet of dough than the first inactive position upon sensing of dough wrapping.

9. The dough product production line of claim 8, wherein the controller is configured to maintain movement of the conveyor when the rotary cutter is in either one of the cutting and non-cutting positions, while stopping the conveyor and a rotation of the rotary cutter when the rotary cutter is in the inactive position.

10. A method of producing dough pieces from a sheet of dough comprising:
    directing the sheet of dough along a conveyor toward a rotary cutter which, when in a cutting position, cuts dough pieces from the sheet of dough;
    sensing an irregularity in the sheet of dough at a position upstream of the rotary cutter; and
    automatically shifting the rotary cutter to a non-cutting position spaced from the sheet of dough upon sensing the irregularity in the sheet of dough and then repositioning the rotary cutter back into contact with the sheet of dough for further cutting of dough pieces from the sheet of dough after the irregularity passes the rotary cutter on the conveyor.

11. The method of claim 10, wherein the rotary cutter is controlled for automatic vertical shifting relative to the sheet of dough.

12. The method of claim 11, further comprising activating linear actuators of a lift/lower device in automatically raising or lowering the rotary cutter.

13. The method of claim 10, further comprising controlling at least one servo to reset an angular position of the rotary cutter while the rotary cutter is spaced from the sheet of dough.

14. The method of claim 10, further comprising visually sensing the irregularity with a camera.

15. The method of claim 10, further comprising sensing any dough wrapping about the rotary cutter and stopping the production line upon sensing the wrapping of dough.

16. The method of claim 15, comprising employing a photo-eye to sense the dough wrapping.

17. The method of claim 15, further comprising shifting the rotary cutter an inactive position spaced further from the sheet of dough than the non-cutting position upon sensing of dough wrapping.

18. The method of claim 17, further comprising maintain movement of the conveyor when the rotary cutter is in either one of the cutting and non-cutting positions, while stopping the conveyor and a rotation of the rotary cutter when the rotary cutter is in the inactive position.

\* \* \* \* \*